(12) United States Patent
Kodavanty et al.

(10) Patent No.: US 11,463,510 B2
(45) Date of Patent: Oct. 4, 2022

(54) SOFTWARE DEFINED WIDE AREA NETWORK UPLINK SELECTION FOR A CLOUD SERVICE

(71) Applicant: HEWLETT PACKARD ENTERPRISE DEVELOPMENT LP, Houston, TX (US)

(72) Inventors: Vamsi Kodavanty, Santa Clara, CA (US); Rajesh Mirukula, Santa Clara, CA (US); Manigandan Ganesan, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/283,454

(22) PCT Filed: Oct. 30, 2018

(86) PCT No.: PCT/US2018/058117
§ 371 (c)(1),
(2) Date: Apr. 7, 2021

(87) PCT Pub. No.: WO2020/091736
PCT Pub. Date: May 7, 2020

(65) Prior Publication Data
US 2021/0352138 A1 Nov. 11, 2021

(51) Int. Cl.
*H04L 67/1004* (2022.01)
(52) U.S. Cl.
CPC .............................. *H04L 67/1004* (2013.01)

(58) Field of Classification Search
CPC .................................................. H04L 67/1004
See application file for complete search history.

(56) References Cited

U.S. PATENT DOCUMENTS

| | | | |
|---|---|---|---|
| 6,795,858 B1 | 9/2004 | Jain et al. | |
| 7,725,901 B2 | 5/2010 | Gissel et al. | |
| 8,024,476 B2 | 9/2011 | Eydelman et al. | |
| 8,209,415 B2 | 6/2012 | Wei | |
| 8,799,899 B2 | 8/2014 | Hur | |

(Continued)

FOREIGN PATENT DOCUMENTS

| | | |
|---|---|---|
| CN | 102439913 A | 5/2012 |
| CN | 102880542 A | 1/2013 |

(Continued)

OTHER PUBLICATIONS

Microsoft, "Traffic Manager Routing Methods," Azure Traffic Manager, Jul. 13, 2017, https://docs.microsoft.com/en-us/azure/traffic-manager/traffic-manager-routing-methods.

(Continued)

*Primary Examiner* — Jimmy H Tran
(74) *Attorney, Agent, or Firm* — Brooks, Cameron & Huebsch, PLLC

(57) ABSTRACT

Software defined wide area network uplink selection for a cloud service can include a network controller to periodically update a list of cloud servers that provide a cloud service. The network controller can select a preferred cloud server from the updated list of cloud servers. Upon receiving a client device request to use the cloud service, the network controller can send identifying information of the selected preferred cloud server to the client device.

24 Claims, 7 Drawing Sheets

(56) References Cited

U.S. PATENT DOCUMENTS

| | | | |
|---|---|---|---|
| 10,110,500 B2 | 10/2018 | Kore et al. | |
| 10,567,288 B1* | 2/2020 | Mutnuru | H04L 67/1017 |
| 10,893,095 B1* | 1/2021 | Taaghol | H04L 67/1076 |
| 11,025,477 B2 | 6/2021 | Ruel et al. | |
| 2008/0267088 A1 | 10/2008 | Dunbar et al. | |
| 2010/0220622 A1 | 9/2010 | Wei | |
| 2010/0325199 A1 | 12/2010 | Park et al. | |
| 2012/0240113 A1 | 9/2012 | Hur | |
| 2013/0159392 A1 | 6/2013 | Huh et al. | |
| 2014/0074911 A1 | 3/2014 | Park et al. | |
| 2014/0241247 A1* | 8/2014 | Kempf | H04W 76/12 |
| | | | 370/328 |
| 2014/0341109 A1* | 11/2014 | Cartmell | H04L 43/50 |
| | | | 370/328 |
| 2015/0071053 A1* | 3/2015 | Kempf | H04L 41/0695 |
| | | | 370/216 |
| 2015/0120909 A1* | 4/2015 | Karthikeyan | H04L 61/1511 |
| | | | 709/224 |
| 2015/0278066 A1 | 10/2015 | France | |
| 2015/0341229 A1 | 11/2015 | Richter et al. | |
| 2015/0358401 A1 | 12/2015 | Flavel et al. | |
| 2016/0364792 A1 | 12/2016 | Kang et al. | |
| 2017/0195161 A1 | 7/2017 | Ruel et al. | |
| 2017/0302535 A1* | 10/2017 | Lee | H04L 41/12 |
| 2017/0310445 A1* | 10/2017 | Kalligudd | H04W 12/033 |
| 2018/0123964 A1 | 5/2018 | Kore et al. | |
| 2018/0359311 A1* | 12/2018 | Paramasivam | G06F 9/505 |
| 2019/0158997 A1* | 5/2019 | Starsinic | H04L 12/14 |
| 2019/0173839 A1* | 6/2019 | Lapidous | H04L 61/1511 |
| 2019/0253454 A1* | 8/2019 | Williams | H04L 63/164 |
| 2019/0319872 A1* | 10/2019 | Adhikari | H04L 45/38 |
| 2019/0386918 A1* | 12/2019 | Iyer | H04L 41/12 |
| 2020/0169533 A1* | 5/2020 | Westberg | H04L 67/1002 |
| 2020/0314694 A1* | 10/2020 | Yu | H04L 69/22 |
| 2020/0358827 A1* | 11/2020 | Foxhoven | H04L 63/08 |
| 2021/0029088 A1* | 1/2021 | Mayya | H04L 45/42 |
| 2021/0195465 A1* | 6/2021 | Behrens | H04W 4/023 |
| 2021/0288865 A1* | 9/2021 | Ruel | H04L 29/06959 |
| 2021/0377210 A1* | 12/2021 | Singh | G06F 21/73 |
| 2021/0377223 A1* | 12/2021 | Chanak | G06F 9/547 |
| 2021/0400113 A1* | 12/2021 | Markuze | H04L 67/28 |
| 2022/0029965 A1* | 1/2022 | Chanak | H04L 67/01 |

FOREIGN PATENT DOCUMENTS

| | | |
|---|---|---|
| CN | 103327088 A | 9/2013 |
| CN | 104662959 A | 5/2015 |
| CN | 105518651 A | 4/2016 |
| CN | 106131096 A | 11/2016 |
| CN | 106464592 A | 2/2017 |
| CN | 108092798 A | 5/2018 |
| KR | 20160101585 A | 8/2016 |

OTHER PUBLICATIONS

Oracle, "Oracle Traffic Director," Data Sheet, 2013, http://www.oracle.com/us/products/middleware/application-server/oracle-traffic-director-ds-1389582.pdf.

Radware, "Server Load Balancing," 2018, https://www.radware.com/resources/server_load_balancing.aspx.

Bl et al., Temporal Task Scheduling for Delay-Constrained Applications in Geo-Distributed Cloud Data Centers, 2018 IEEE 11th International Conference on Cloud Computing, Sep. 1, 2018, 8 pages.

English Abstract on "The Research of the storage resource management technology based on Cloud", CNKI, Aug. 15, 2015, 58 pages.

Yang Nan, English Abstract on "Research on Key technologies of Cloud manufacturing platform facing to Small and medium-sized enterprise", CNKI, Jan. 15, 2014, 123 pages.

Zhang et al., "Inflight Modifications of Content: Who are the Culprits?", USENIX, Mar. 24, 2011, 8 pages.

* cited by examiner

SOFTWARE DEFINED WIDE AREA NETWORK UPLINK SELECTION FOR A CLOUD SERVICE

BACKGROUND

In a software defined wide area network (SD-WAN), wide area network (WAN) links are established between a virtual private network concentrator (VPNC) at a core site of the network and a branch gateway (BG) in a branch or campus site of the network. These WAN links may be provided by an internet service provider (ISP) in lieu of expensive and high-touch dedicated networking infrastructure like Multi-protocol Label Switching (MPLS) links. The ISP may provide, for example, a digital subscriber line (DSL) to a campus or branch site of the network for use as an uplink to the core site.

In some instances, a packet from a client device (e.g. phone, laptop, server, etc.) at the branch site destined for an Internet device (e.g. a cloud server that provides a cloud service) passes through the WAN link to the core site before being routed to the final destination. One purpose of this initial routing through the WAN link is that certain services (e.g. firewall, domain name service) may be provided at or more effectively at the core site. In some other instances, a packet from the client device at the branch site destined for an Internet device is directly routed from the branch site to the final destination. A WAN link between a branch site and a core site may include multiple individual uplinks (e.g. multiple DSL uplinks from ISPs), and the performance of each individual uplink may improve or degrade dependent on specific network conditions for that uplink at a certain time.

DETAILED DESCRIPTION

Figure 1:
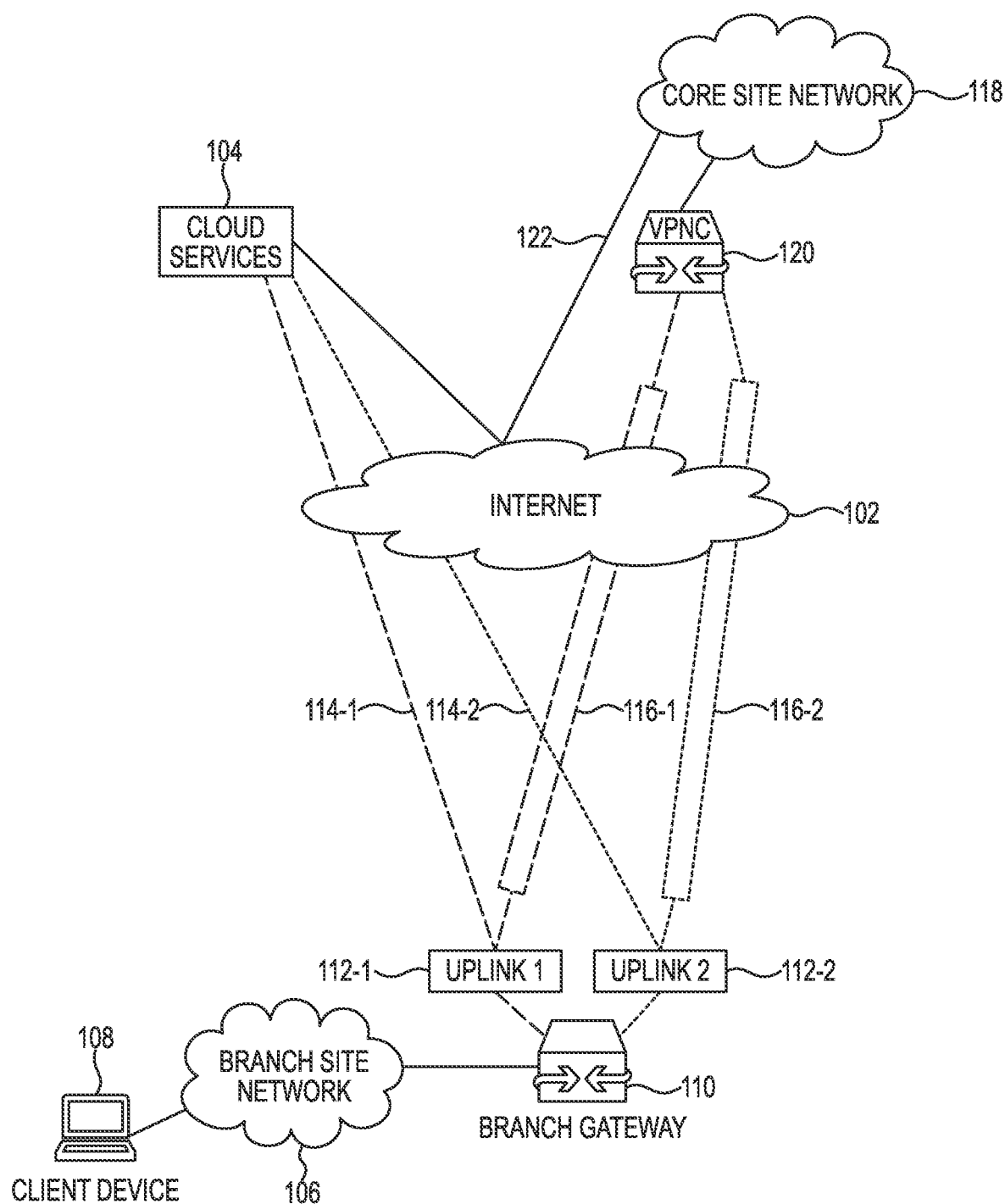
FIG. 1 illustrates an example of a client device at a branch site of a software defined wide area network communicating with a cloud service.

Cloud services, such as software as a service (SaaS) applications, often benefit from being handled in a coordinated manner across a network such as a multi-site enterprise network. Cloud services (e.g. network services, SaaS applications, desktop as a service, platform as a service, infrastructure as a service, etc.) may be provided from any one of a number of servers located in geographically and network diverse locations, and network infrastructure (e.g. routers, switches, access points, network controllers, etc.) may implement policies to more efficiently route traffic to and from each cloud service. Examples of cloud services include Amazon Web Services®, Salesforce™, Microsoft Office 365™, and Dropox™, among others. Network controllers for software defined networks (SDNs) can implement a control plane, such as a centralized control plane, hierarchical control plane, or distributed control plane, which is separate from the data switching and routing infrastructure. Devices such as branch gateways (BGs) and virtual private network concentrators (VPNCs) can serve as network controllers. In an SDN context, such as a branch site that implements a software defined wide area network (SD-WAN), a network controller may implement a flow for cloud services on a per-application, per-class, per-group, or pan-SaaS basis.

By controlling cloud service related network traffic at a network level, rather than relying on individual devices to handle the traffic, the network can compile additional information to achieve greater insight into the network conditions between the client devices and the cloud servers. The greater insight may be used to dynamically adjust the routing of cloud service related traffic to follow preferred routes. For example, a network controller, such as a BG, gathers information about the set of cloud servers providing SaaS-A.

The greater insight gathered from across the network may improve the network function by reducing latency in accessing a cloud service, by reducing network response time to changes in the network topology and characteristics that alter cloud service performance, by dynamically healing cloud service outages at particular cloud servers, by reducing administrative burden of the network by automating portions of the network interaction with cloud services.

In this disclosure, SaaS may be used as an example of cloud services generically, not to the exclusion of other cloud services. Where SaaS-A, -B, -C . . . -N is used, it refers to behavior relating to a certain SaaS application, as opposed to SaaS applications on the whole. Such notation may be used to show how different SaaS applications can be handled differently from one another by the network or to show how the system handles SaaS applications on an individual basis. Furthermore, a BG may be used as an example of a network controller, not to the exclusion of other network controllers. The BG may then dynamically gather information about each SaaS-A server, including the health of each server and path health of different paths from the client to each server. The BG may acquire information about the servers as measured from other locations, such as another branch site or a core site of the network.

The BG may gather some or all of the information about the SaaS-A servers by sending out probe packets through the Internet requesting measurements such as jitter, latency, and other performance information. In some examples, the BG sends HTTP probes to avoid having the packets blocked by network infrastructure that is not owned nor configurable by network administrators who administer the BG. The HTTP probes may measure additional performance information, such as the health of the SaaS-A application, that cannot be measured by a traditional "ping" packet.

The BG may also send out domain name service (DNS) probe packets to gather a list of the set of SaaS-A servers available. DNS caching servers provided by a given ISP for a BG in a given geolocation or routing location may not contain a canonical list of all available SaaS-A servers available. Rather, the ISP may statically improve the list based on rudimentary factors (number of hops between source and destination, for example). However, a detailed analysis of regularly collected performance information may reveal additional SaaS-A servers that are "less optimal" but actually provide higher quality of service. For example, a BG may acquire DNS records, path health information, server health information, and other relevant information from a gateway in another branch or in a core site of the network and use the acquired information to put together a more comprehensive view of the SaaS-A server topology across the Internet.

The figures herein follow a numbering convention in which the first digit corresponds to the drawing figure number and the remaining digits identify an element or component in the drawing. For example, reference numeral 224 refers to element "24" in FIG. 2 and an analogous element may be identified by reference numeral 524 in FIG. 5. Analogous elements within a Figure may be referenced with a hyphen and extra numeral or letter. See, for example, elements 112-1, and 112-2 in FIG. 1. Such analogous elements may be generally referenced without the hyphen and extra numeral or letter. For example, elements 112-1 and 112-2 may be collectively referenced as 112.

FIG. 1 illustrates an example of a client device 108 at a branch site of a software defined wide area network communicating with a cloud service 104. A WAN may include a plurality of local area networks (LANs), such as is represented by branch site network 106 and core site network 118, each of which may be in different locations, such as different offices of an enterprise. However, in some examples, the branch site network 106 and/or the core site network can include more than one LAN.

The client device 108 is an electronic device that can include processing circuitry (e.g., a processor, an application specific integrated circuit, a field programmable gate array, etc.) and memory (e.g., a machine-readable medium). The client device 108 can be capable of receiving inputs and providing outputs to a human user and capable of communicating with a network. Examples of client devices include desktop computers, smartphones, notebooks, tablets, touch-screen devices, computing devices embedded within an automobile or another machine, or the like. The client device 108 can be connected to the branch site network 106 in a wired or wireless manner.

A BG 110 or other network device can connect the branch site network 106 to the rest of the SD-WAN. In some examples, the BG 110 can also function as a network controller for the SD-WAN or a portion thereof. In some examples, other network devices can provide a control plane for the SD-WAN (not specifically illustrated). A network controller can be capable of receiving, transmitting, processing, routing, and/or providing packets traversing the SD-WAN. A network controller can manage the SD-WAN by performing careful and adaptive traffic engineering by assigning new transfer requests according to current usage of resources such as links. A packet is a communication structure for communicating information, such as a protocol data unit (PDU), a packet, a frame, a datagram, a segment, a message, a block, a cell, a frame, a subframe, a slot, a symbol, a portion of any of the above, or another type of formatted or unformatted unit of data capable of being transmitted via a network.

The BG 110 can connect the branch site network 106 to the core site network 118 via a virtual private network concentrator (VPNC) 120 and the Internet 102. The VPNC 120 is a type of networking device that provides secure creation of virtual private network (VPN) connections and delivery of messages between VPN nodes. The VPNC 120 can function analogously to a router, but for creating and managing VPN communication infrastructures. In some examples, the VPNC 120 can also function as a network controller for the SD-WAN or a portion thereof. In some examples, other network devices can provide a control plane for the SD-WAN (not specifically illustrated). More specifically, the BG 110 can be connected to the VPNC 120 through the Internet 102 via a first tunnel 116-1 using a first uplink 112-1 and a second tunnel 116-2 using a second uplink 112-2. The tunnels 116 can be implemented over various connections such as a telecommunications connection such as an LTE or 4G connection facilitated by a telecommunications tower, a wireless Internet connection facilitated by a Wi-Fi access point, and/or an Ethernet connection facilitated by a switch. In some examples, a different quantity of tunnels can be used to connect the BG 110 to the VPNC 120.

As further shown in FIG. 1, the BG 110 is in communication with cloud services 104 via a first connection 114-1 from the first uplink 112-1 and a second connection 114-2 from the second uplink 112-2 through the Internet 102. Although two connections 114-1, 114-2 are illustrated, in some examples the BG 110 can be connected to the cloud services 104 via a different number of connections. The connections 114 can be referred to as direct connections to the cloud services 104 from the branch site network 106 rather than a tunneled connection 122 (e.g., hub exit) from the core site network 118 via the tunnels 116. There may be instances when either or both of the connections 114 provide better network performance than the hub exit 122 via either or both of the tunnels 116. The cloud services 104 indicate information technology services that are provided via a cloud service model as opposed to, for example, a client-server model. Examples of such cloud service models include infrastructure as a service (IaaS), platform as a service (PaaS), and SaaS. The cloud services 104 can be provided by any number of cloud servers, such as SaaS application servers, for example. The cloud servers can be Internet of Things (IoT) devices, services provided by infrastructure, virtualized servers, or other computing device functionality capable of providing the cloud services 104. The cloud servers can be geographically distributed over a large area. Therefore, in selecting a preferred cloud server for a cloud service 104, the BG 110 also selects a preferred network path including a preferred uplink 112 and a pre-ferred connection 114, 116 of the preferred uplink 112.

Figure 2:
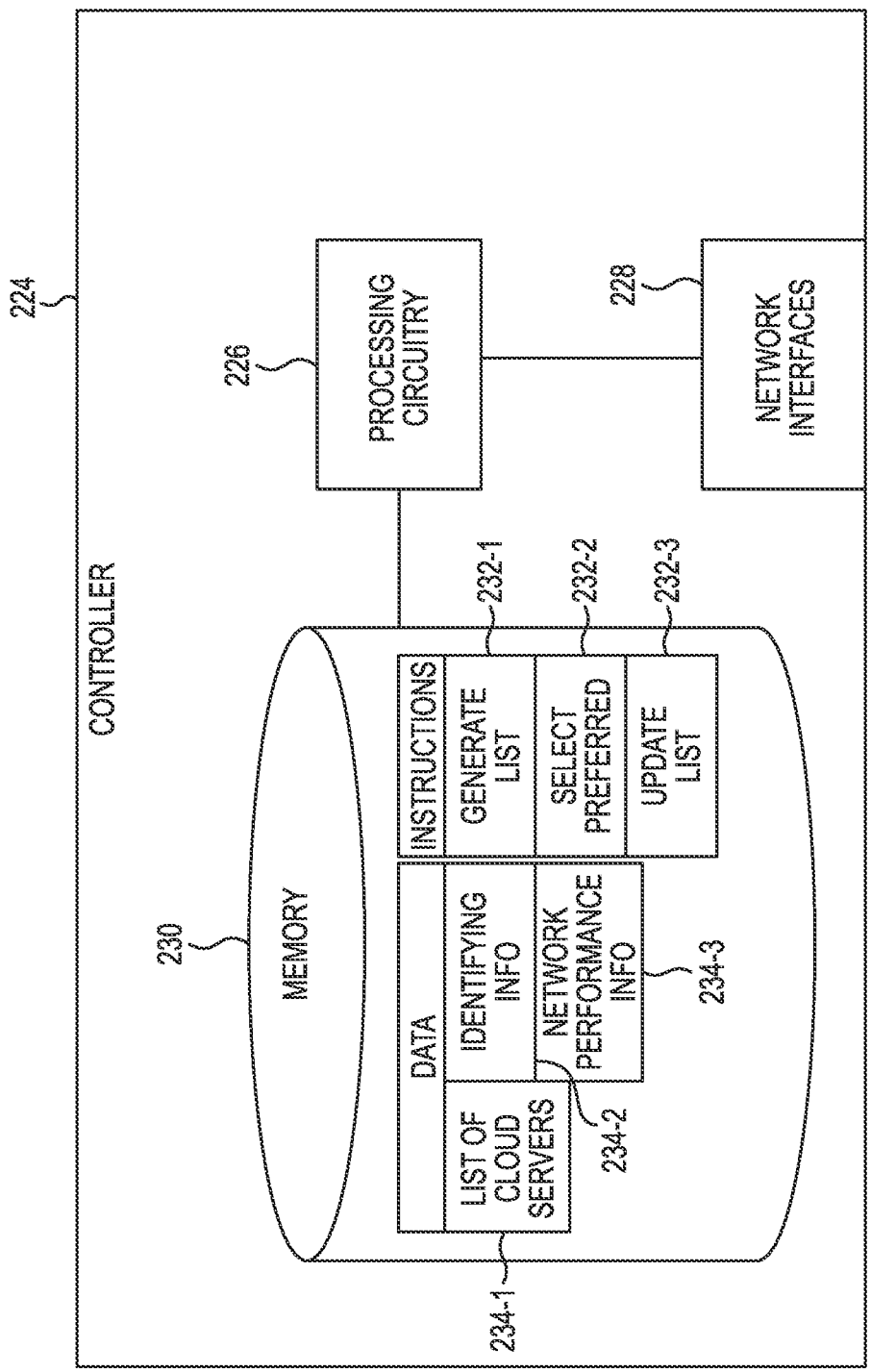
FIG. 2 illustrates an example of a network controller for software defined wide area network uplink selection for a cloud service.

FIG. 2 illustrates an example of a network controller 224 for software defined wide area network uplink selection for a cloud service. With respect to FIG. 1, the network controller 224 can be implemented by the BG 110, the VPNC 120, other components that are not specifically illustrated, or combinations thereof. The network controller 224 can include processing circuitry 226, network interfaces 228, and memory 230. The memory 230 can store instructions that, when executed by the processing circuitry 226, cause the processing circuitry 226 to generate 232-1 a list 234-1 of cloud servers that provide a cloud service. The list 234-1 can be generated by transmitting probe packets and receiving identifying information 234-2 and network performance information 234-3 for a plurality of cloud servers that provide the cloud services. The instructions can be executed by the processing circuitry 226 to select 232-2 a preferred cloud server from the list of cloud servers and update 232-3 the list of cloud servers.

The instructions to generate 232-1 the list 234-1 of cloud servers can include instructions to transmit a name query to a name server (e.g., a DNS server) and receive a response from the name server including the identifying information 234-2. The instructions to generate 232-1 the list 234-1 of cloud servers can include instructions to transmit a name query to another network controller and receive a response from the other network controller including additional information for a plurality of additional cloud servers that provide the cloud service. For example, the other network controller can be in a geographically different location than the original network controller 224. By way of example with respect to FIG. 1, the other network controller may be the VPNC 120. The name query transmitted by the other network controller may return different or additional cloud servers than the name query transmitted by the original network controller 224. The instructions to generate 232-1 the list 234-1 of cloud servers can include instructions to generate based on the plurality of cloud servers identified in the response from the name server and on the plurality of additional cloud servers identified in the response from the other network controller.

Discovering as many (or all) of the cloud servers that provide the cloud service can be beneficial for routing traffic from the client device to the cloud service. Depending on network conditions and/or the health and status of various cloud servers or links thereto, different cloud servers or links thereto may provide a better quality of service than other cloud servers. In some examples, a particular cloud server that provides a best quality of service for the client device can be selected as the preferred cloud server for the client device.

To handle HTTP probing, a fully qualified domain name (FQDN) and the uniform resource indicator (URI) can be specified per cloud service. In some examples, this information can be stored in response to a new cloud application being requested by a client device. The information can be used to configure probe packets for the cloud service. The network controller 224 can configure a definition of the cloud service, which can be used in firewall, route, and/or dynamic path selection (DPS) policies. For example, a deep packet inspection (DPI) cloud service identifier can be allocated to the cloud application and referenced by the firewall, route, and/or DPS policies. In some examples, the network controller 224 can include a programmable option that controls whether the HTTP probing controls the liveness of any overlay tunnels (e.g., tunnels 116 illustrated in FIG. 1) to the destination.

Since the default name server used by a client device may not be reliable to respond with the preferred cloud server, particularly in an SD-WAN setting, the network controller can maintain a list of name servers reachable over the uplinks (e.g., uplinks 112 illustrated in FIG. 1) as well as reachable over the core site network (e.g., core site network 118 illustrated in FIG. 1). The use of appropriate name servers for the SD-WAN can improve the discovery of the cloud servers that provide the cloud service. In some examples, name servers identified by uplinks that use dynamic host configuration protocol (DHCP) can be used rather than relying on the list of name servers maintained by the network controller. The network controller 224 can store in the list, a respective next hop to reach each of the name servers in the list. The list can be used to send DNS requests as well as probes to the cloud servers identified by the name servers. For example, with respect to FIG. 1, the BG 110 can store such a list, which can also include pointers to the VPNC 120 for name servers to be used by the VPNC, such as for traffic from a client device to the core site network. The network controller 224 can store a cloud server list and a DPS list as described in more detail below with respect to FIG. 5.

Figure 3:
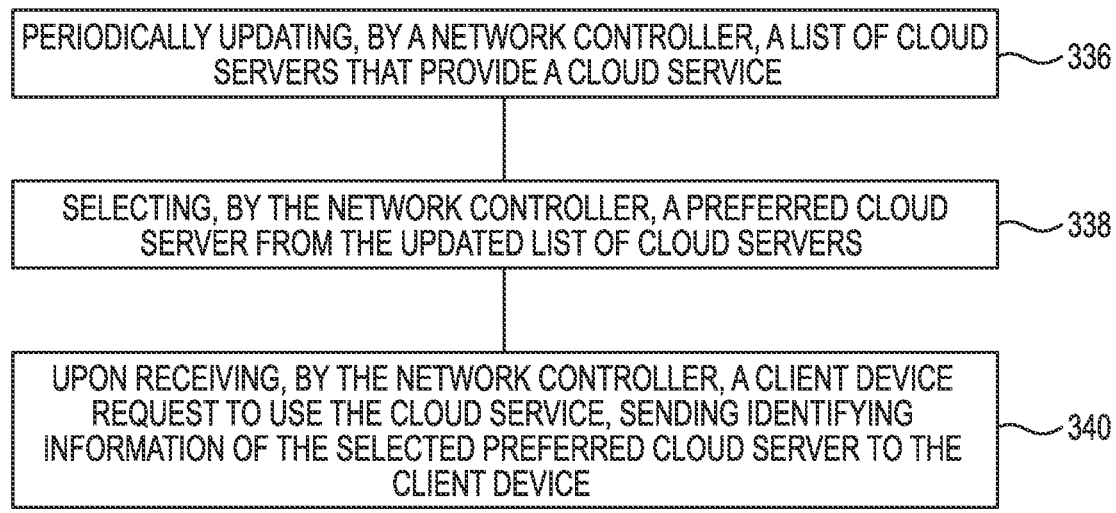
FIG. 3 illustrates an example method for software defined wide area network uplink selection for a cloud service.

FIG. 3 illustrates an example method for software defined wide area network uplink selection for a cloud service. At 336, the method includes periodically updating, by a network controller, a list of cloud servers that provide a cloud service. At 338, the method includes selecting, by the network controller, a preferred cloud server from the updated list of cloud servers. At 340, the method includes upon receiving, by the network controller, a client device request to use the cloud service, sending identifying information of the selected preferred cloud server to the client device.

Figure 4:
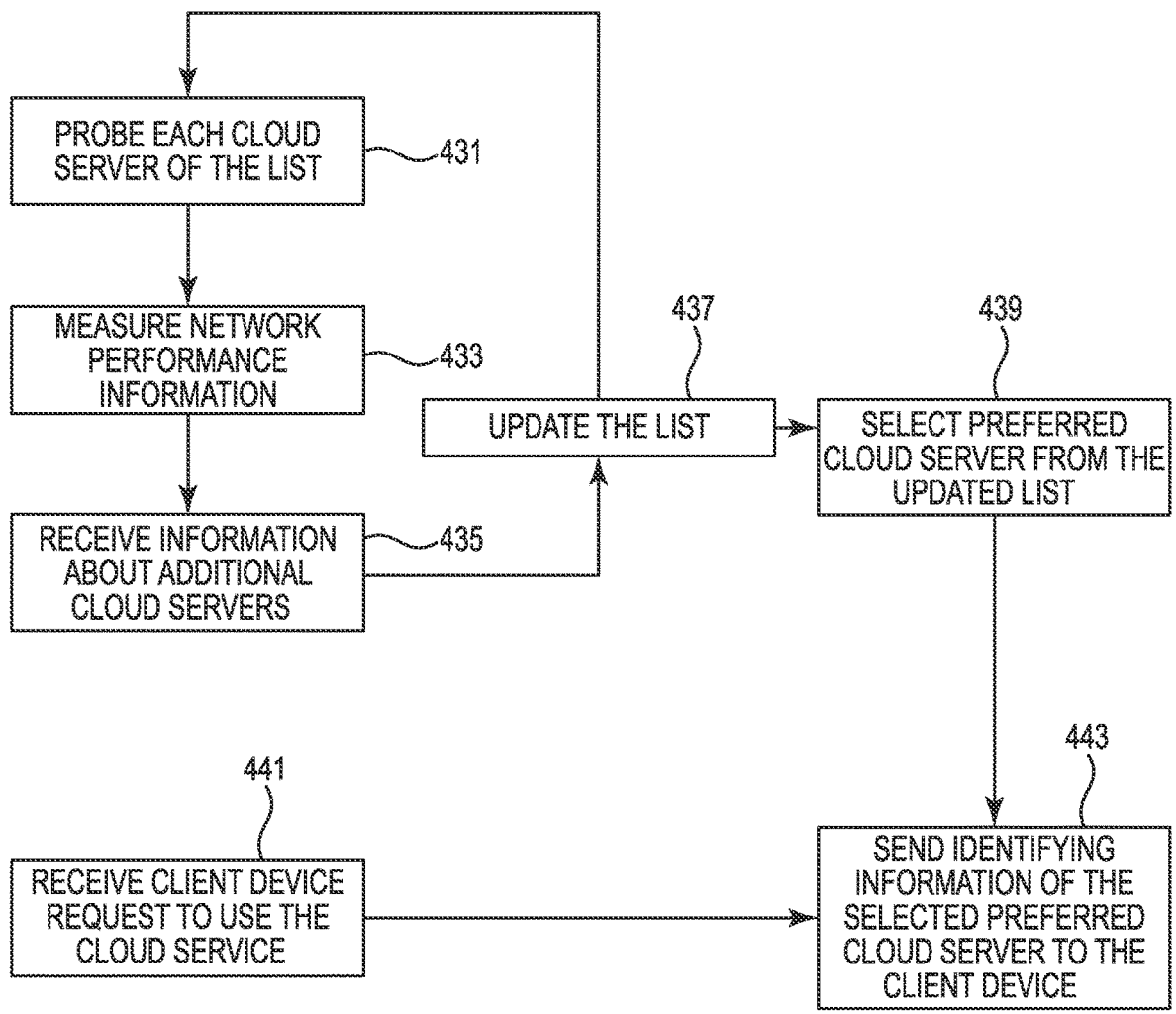
FIG. 4 illustrates an example method for software defined wide area network uplink selection for a cloud service with more detail regarding updating the list of cloud servers.

FIG. 4 illustrates an example method for software defined wide area network uplink selection for a cloud service with more detail regarding updating the list of cloud servers. The method described with respect to FIG. 4 can be performed by a network controller. At 431, the method includes sending a probe (e.g., an HTTP probe) to each cloud server of the list of cloud servers. At 433, the method includes measuring network performance information relating to each cloud server (e.g., via the probe send to each cloud server). Examples of performance information include jitter and latency, among others. At 435, the method includes receiving information about additional cloud servers from another network controller. At 437, the method includes periodically updating, by a network controller, a list of cloud servers that provide a cloud service. The periodic updating of the list can occur on regular intervals, irregular intervals, randomly, or in response to any event described with respect to elements 431, 433, and 435.

At 439, the method includes selecting a preferred cloud server from the updated list of cloud servers. The selected cloud server can be selected based in part on performance information for each cloud server of the list of cloud servers and locale of the client device. The locale of the client device can refer to a set of parameters that defines the client device's language, region, and/or any special variant preferences such as of client device uplink usage preferences and/or client device bandwidth usage preferences. In some examples, the preferred cloud server is the cloud server nearest to the client device.

At 441, the method includes receiving a client device request to use the cloud service. At 443, the method includes sending identifying information of the selected preferred cloud server to the client device. Identifying information can include, for example, an IP address for the selected preferred cloud server.

Figure 5:
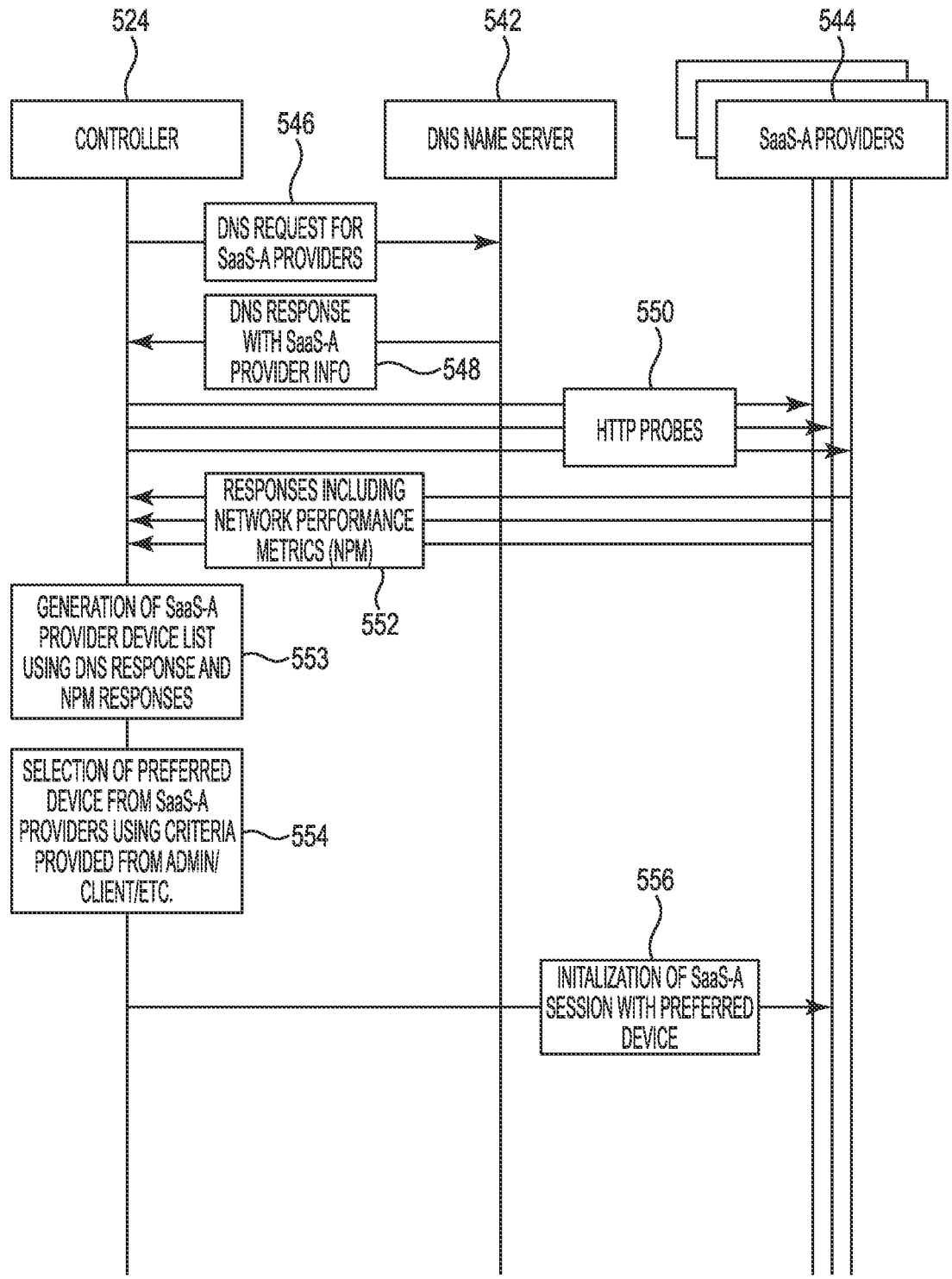
FIG. 5 illustrates an example of a message flow for software defined wide area network uplink selection for a cloud service.

FIG. 5 illustrates an example of a message flow for software defined wide area network uplink selection for a cloud service. The message flow can occur between a network controller 524, a name server 542 (e.g., "DNS Name Server"), and cloud servers 544 that provide a cloud service (e.g., "SaaS-A Providers"). The network controller 524 can send a DNS request 546 for SaaS-A providers. For example, DNS requests can be used to resolve the FQDN for each cloud service configured on each next hop specified in the name server list of the network controller 524.

The DNS name server 542 can provide a DNS response 548 with SaaS-A provider information. The SaaS-A provider information can include identifying information of the cloud servers, such as an IP address. This information can be used to identify and classify the cloud application (e.g., when the first packet is received) to avoid a network address translation (NAT) issue that might otherwise occur when a flow might switch from one uplink to another during DPS.

The network controller 524 can send HTTP probe packets 550 to the identified cloud servers 544. In some examples, the network controller 524 can add a keepalive keyword to the HTTP probes 550 to indicate to the system that the probe results affect tunnels built to reach the cloud service endpoint. The network controller 524 can initiate the HTTP probes 550 for each cloud server 544 using the FQDN and/or the URI from the cloud server configuration, the name server list, and/or the cloud server list. The results 552 of the HTTP probes can be responses from the cloud servers 544 including network performance information, which may also be referred to as "network performance metrics (NPM)".

The results 552 of the HTTP probes 552 and the DNS response 548 can be used by the network controller 524 to create a cloud server list 553 ("generation of SaaS-A provider device list using DNS response and NPM responses). The cloud server list can include a correspondence between cloud servers and name servers. The cloud server list can be used along with the name server list to route HTTP probes 550 over the correct next hop without having to specifically install static routes for each discovered cloud server. The results 552 of the HTTP probes 552 can be used in the DPS policy for the cloud service.

The network controller 524 can select a preferred cloud server 554 from the list of cloud servers ("selection of a preferred device from SaaS-A providers using criteria provided from admin/client/etc."). The network controller 524 can initiate a session 556 with the preferred cloud server ("initialization of SaaS-A session with preferred device") for client traffic. For traffic steering, the network controller 524 can periodically update a DPS list that includes a correspondence between a respective preferred cloud server/next hop for the preferred cloud server and each cloud service. The DPS list can be used to respond to DNS requests as well as for traffic steering. Thus, DPS can be performed in the background periodically instead of when the session to the cloud service is created.

Figure 6:
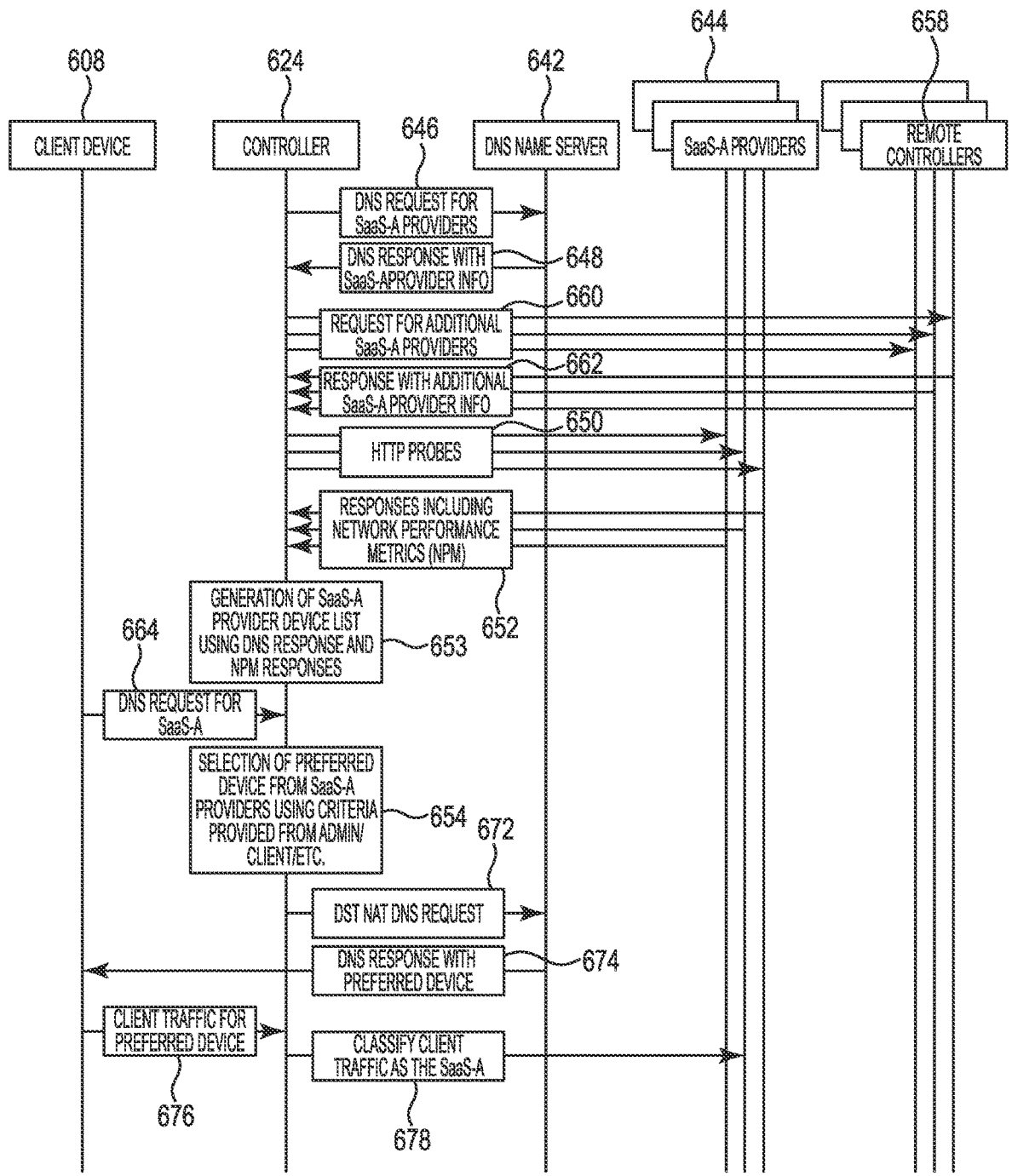
FIG. 6 illustrates an example of a message flow for software defined wide area network uplink selection for a cloud service with name server redirect.

FIG. 6 illustrates an example of a message flow for software defined wide area network uplink selection for a cloud service with name server redirect. The message flow can occur between a client device 608, a network controller 624, a name server 642 (e.g., "DNS Name Server"), cloud servers 644 that provide a cloud service (e.g., "SaaS-A Providers"), and/or a number of remote controllers 658. As in the example illustrated in FIG. 5, the network controller 624 can send a DNS request 646 for SaaS-A providers and the DNS name server 642 can provide a DNS response 648 with SaaS-A provider information.

The example illustrated in FIG. 6 highlights additional functionality of the network controller 624, where a request for additional cloud servers for the cloud service 660 ("request for additional SaaS-A providers") can be sent to the remote controllers 658 (e.g., the VPNC 120 illustrated in FIG. 1). The remote controllers 658 can respond by providing information about other cloud servers 662 ("response with additional SaaS-A provider info"). The additional cloud servers can be cloud servers that were not identified in the original DNS response 648, because, for example, the additional cloud servers were too remote from the relevant name servers to be identified thereby in response to the DNS request 646.

The network controller 624 can send HTTP probe packets 650 to the identified cloud servers 644 (including the additionally identified cloud servers). For example, the network controller 624 can probe each of the plurality of cloud servers 644 based on results 648 of the plurality of name queries 646 already sent by the network controller 624. The results 652 of the HTTP probes can be responses from the cloud servers 644 including network performance information. The results 652 of the HTTP probes 652 and the DNS response 648 can be used by the network controller 624 to create a cloud server list 653. The network controller 624 can create a DPS policy for traffic from the client device 608 to the cloud service based on results 652 of the probes.

The client device 608 can initiate a name query 664 for a cloud service ("DNS request for SaaS-A"), which can be intercepted by the network controller 624. The network controller 624 can intercept the name query 664 from the client device 608 without changing name query settings of the client device 608. The client device 608 could be using an arbitrary name server and the results it returns may not yield the preferred server. The network controller 624 can select a preferred cloud server 654 from the list of cloud servers.

Although the name query 664 is illustrated as occurring after the generation of the cloud server list 653, the name query 664 can also occur before the network controller 624 sends the DNS request 646 for SaaS-A providers 646. In other words, in some examples, the cloud service may initially be requested by the client device 608 before the network controller has taken any actions to configure the cloud service. However, the illustration of the name query 664 from the client device 608 occurring before selection of the preferred cloud server indicates that the network controller 624 can select the preferred server at or near the time of the name query 664 so that the network controller 624 does not respond with stale information (e.g., a server that no longer qualifies as preferred due to changing conditions in the SD-WAN).

In the example illustrated in FIG. 6, after the name query 664 from the client device 608 is intercepted by the network controller 624, the network controller can consult the DPS list select the preferred cloud server 654 and then apply destination network address translation to the name query 672 ("DST NAT the DNS request") such that the name query is sent to the name server/next hop where the preferred cloud server was discovered. For example, the network controller 624 can apply the DST NAT to the name query to send the name query to one of a plurality of name servers 642 according to a name server list stored by the network controller 624. The intent is that the name server 642 will respond 674 to the client device 608 with the same preferred cloud server in response to the name query ("DNS response with preferred device").

The client device 608 can then use the preferred cloud server for subsequent traffic 676 ("client traffic for preferred device"). In some examples, the client device 608 can use the response 674 from the name server 642 until a DNS cache of the client device 608 ages out. The network controller 624 can classify 678 the client traffic as being intended for the cloud service ("classify client traffic as the SaaS-A"), for example, with reference to the cloud server list. The network controller 624 can use the cloud server list to identify the correct next hop for forward the client traffic flow. The network controller 624 may not reapply DPS for the flow because it can be applied during the DNS response time.

Figure 7:
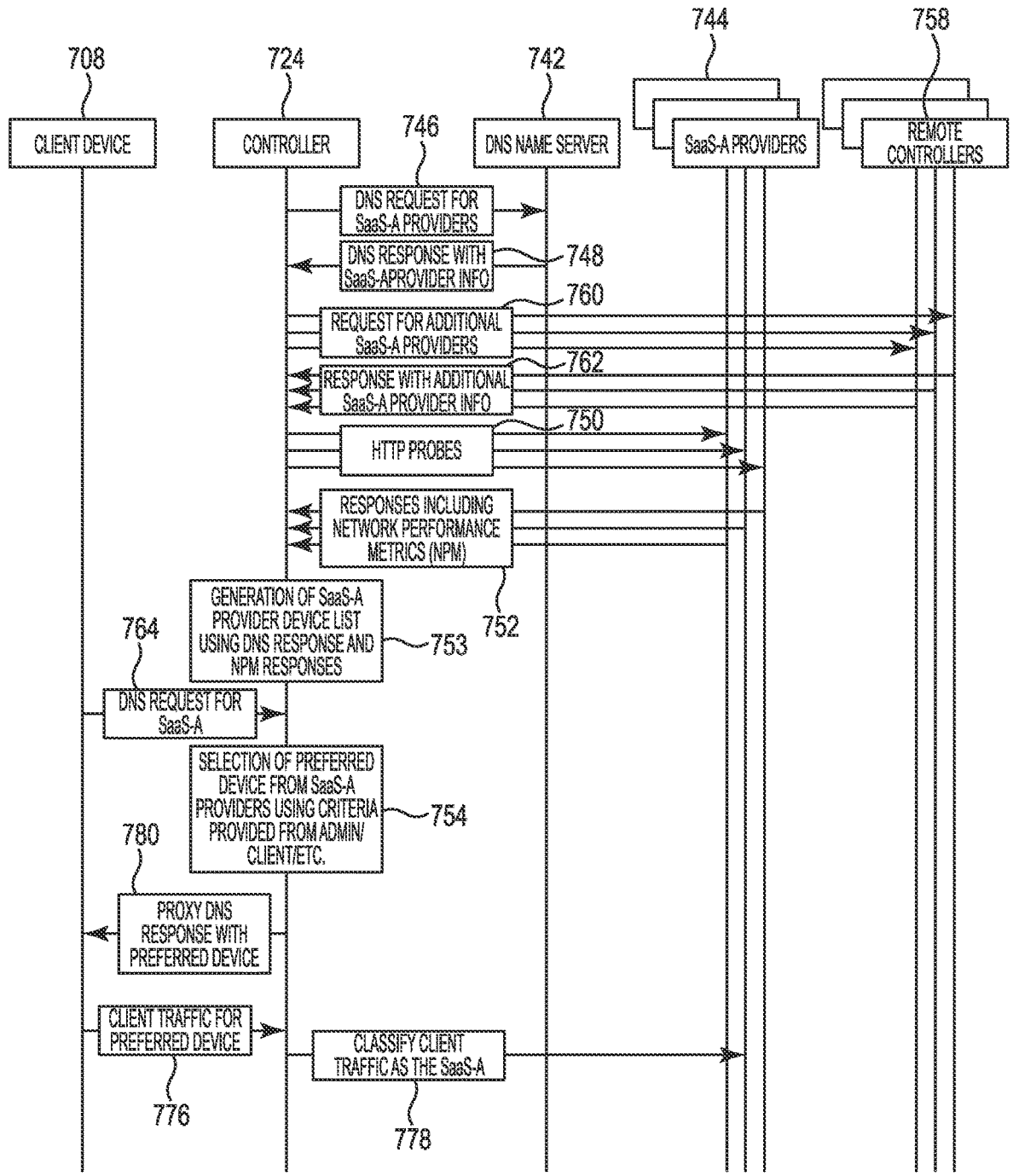
FIG. 7 illustrates an example of a message flow for software defined wide area network uplink selection for a cloud service with a proxied name server.

FIG. 7 illustrates an example of a message flow for software defined wide area network uplink selection for a cloud service with a proxied name server. The message flow can occur between a client device 708, a network controller 724, a name server 742 (e.g., "DNS Name Server"), cloud servers 744 that provide a cloud service (e.g., "SaaS-A Providers"), and/or a number of remote controllers 758. As in the example illustrated in FIG. 5, the network controller 724 can send a DNS request 746 for SaaS-A providers and the DNS name server 742 can provide a DNS response 748 with SaaS-A provider information.

The example illustrated in FIG. 7 highlights additional functionality of the network controller 724, where a request for additional cloud servers for the cloud service 760 ("request for additional SaaS-A providers") can be sent to the remote controllers 758 (e.g., the VPNC 120 illustrated in FIG. 1). The remote controllers 758 can respond by providing information about other cloud servers 762 ("response with additional SaaS-A provider info"). The additional cloud servers can be cloud servers that were not identified in the original DNS response 748, because, for example, the additional cloud servers were too remote from the relevant name servers to be identified thereby in response to the DNS request 746.

The network controller 724 can send HTTP probe packets 750 to the identified cloud servers 744 (including the additionally identified cloud servers). For example, the network controller 724 can probe each of the plurality of cloud servers 744 based on results 748 of the plurality of name queries 746 already sent by the network controller 724. The results 752 of the HTTP probes can be responses from the cloud servers 744 including network performance information. The results 752 of the HTTP probes 752 and the DNS response 748 can be used by the network controller 724 to create a cloud server list 753. The network controller 724 can create a DPS policy for traffic from the client device 708 to the cloud service based on results 752 of the probes.

The client device 708 can initiate a name query 764 for a cloud service ("DNS request for SaaS-A"), which can be intercepted by the network controller 724. The network controller 724 can intercept the name query 764 from the client device 708 without changing name query settings of the client device 708. The client device 708 could be using an arbitrary name server and the results it returns may not yield the preferred server. The network controller 724 can select a preferred cloud server 754 from the list of cloud servers.

Although the name query 764 is illustrated as occurring after the generation of the cloud server list 753, the name query 764 can also occur before the network controller 724 sends the DNS request 746 for SaaS-A providers 746. In other words, in some examples, the cloud service may initially be requested by the client device 708 before the network controller has taken any actions to configure the cloud service. However, the illustration of the name query 764 from the client device 708 occurring before selection of the preferred cloud server indicates that the network controller 724 can select the preferred server at or near the time of the name query 764 so that the network controller 724 does not respond with stale information (e.g., a server that no longer qualifies as preferred due to changing conditions in the SD-WAN).

Instead of DST NATing the name query (as illustrated at 672 in FIG. 6) from the client device 708 to the name server 742, the network controller 724 can respond to the client device 708 by proxying a response 780 ("proxy DNS response with preferred device") from the name server 742 with the preferred cloud server identified. In some examples, the proxied response may indicate a device that is not the controller 724, such as a switch or router controlled by the controller 724. The network controller 724 can proxy the DNS response with reference to the DPS list, which includes the correspondence between the cloud service and the selected preferred cloud serer and next hop therefor. According to this example approach, DNS traffic may not be subject to DST NAT. The client device 708 can then use the preferred cloud server for subsequent traffic 776 ("client traffic for preferred device") and the network controller 724 can classify 778 the client traffic as being intended for the cloud service ("classify client traffic as the SaaS-A"), for example, with reference to the cloud server list. Such an approach can provide the preferred cloud server from the DPS list without having to rely on the name server 742 to operate consistently over time.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

Elements shown in the various figures herein can be added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed is:

1. A system, comprising:
a client device to initiate a name query for a cloud service; and
a network controller connected to the client device, comprising processing circuitry and memory including instructions that, when executed by the processing circuitry, cause the processing circuitry to:
transmit a plurality of name queries, according to a name server list for cloud service handling, to identify a plurality of cloud servers that provide the cloud service;
probe each of the plurality of cloud servers based on results of the plurality of name queries;
create a dynamic path selection (DPS) policy for traffic from the client device to the cloud service based on results of the probes; and
intercept the name query from the client device without changing name query settings of the client device.

2. The system of claim 1, including the network controller to intercept the name query and apply destination network address translation to the name query to send the name query to one of a plurality of name servers according to the name server list; and
including the client device to receive a response of the destination network address translated name query identifying one of the plurality of cloud servers and use the one of the plurality of cloud servers for subsequent traffic for the cloud service.

3. The system of claim 1, wherein the network controller comprises a branch gateway connected to the Internet via a plurality of uplinks, and
wherein the client device is connected to the network controller via a branch site network; and
including the network controller to select one of the plurality of uplinks for traffic from the client device to the cloud service according to the DPS policy.

4. The system of claim 3, wherein each of the plurality of uplinks are connected to the Internet via more than one Internet service provider.

5. The system of claim 3, further including a virtual private network concentrator (VPNC) connected to a core site network and to the Internet;

wherein a plurality of name servers, referenced in the name server list, are preconfigured to point to the VPNC for traffic from the client device to the core site network.

6. The system of claim 1, including the network controller to provide a deep packet inspection (DPI) identifier to the cloud service for reference by firewall, route, and DPS policies of a software defined wide area network.

7. The system of claim 1, including the network controller to:
store the name server list including a correspondence between each of a plurality of name servers and a respective next hop from the network controller to each of the plurality of name servers;
store a cloud server list including a correspondence between each of the plurality of cloud servers and each of the plurality of name servers according to results of the plurality of name queries; and
probe each of the plurality of cloud servers according to the name server list and the cloud server list.

8. The system of claim 7, including the network controller further to:
send a respective plurality of name queries, based on the name server list for cloud service handling, to identify a respective plurality of cloud servers that provide each of a plurality of cloud services;
probe each of the respective pluralities of cloud servers based on results of the respective pluralities of name queries; and
store a DPS list as the DPS policy including, for each of the plurality of cloud services, a corresponding preferred cloud server based on results of the probes.

9. A method comprising:
transmitting, by a network controller connected to a client device, a plurality of name queries, according to a name server list for cloud service handling, to identify a plurality of cloud servers that provide the cloud service;
probing each of the plurality of cloud servers based on results of the plurality of name queries;
creating a dynamic path selection (DPS) policy for traffic from the client device to the cloud service based on results of the probes; and
intercepting the name query from the client device without changing name query settings of the client device.

10. The method of claim 9, further comprising:
intercepting, by the network controller, the name query and apply destination network address translation to the name query to send the name query to one of a plurality of name servers according to the name server list; and
receiving, by the client device, a response of the destination network address translated name query identifying one of the plurality of cloud servers and use the one of the plurality of cloud servers for subsequent traffic for the cloud service.

11. The method of claim 9, wherein the network controller comprises a branch gateway connected to the Internet via a plurality of uplinks, wherein the client device is connected to the network controller via a branch site network, and wherein the method further comprises:
selecting, by the network controller, one of the plurality of uplinks for traffic from the client device to the cloud service according to the DPS policy.

12. The method of claim 11, wherein each of the plurality of uplinks are connected to the Internet via more than one Internet service provider.

13. The method of claim 11, further comprising:
preconfiguring a plurality of name servers, referenced in the name server list, to point to a virtual private network concentrator (VPNC) connected to a core site network and to the Internet, wherein the VPNC is for traffic from the client device to the core site network.

14. The method of claim 9, further comprising:
providing, by the network controller, a deep packet inspection (DPI) identifier to the cloud service for reference by firewall, route, and DPS policies of a software defined wide area network.

15. The method of claim 9, further comprising:
storing the name server list including a correspondence between each of a plurality of name servers and a respective next hop from the network controller to each of the plurality of name servers;
storing a cloud server list including a correspondence between each of the plurality of cloud servers and each of the plurality of name servers according to results of the plurality of name queries; and
probing each of the plurality of cloud servers according to the name server list and the cloud server list.

16. The method of claim 15, further comprising:
sending a respective plurality of name queries, based on the name server list for cloud service handling, to identify a respective plurality of cloud servers that provide each of a plurality of cloud services;
probing each of the respective pluralities of cloud servers based on results of the respective pluralities of name queries; and
storing a DPS list as the DPS policy including, for each of the plurality of cloud services, a corresponding preferred cloud server based on results of the probes.

17. A non-transitory computer-readable storage medium storing a plurality of instructions executable by one or more processors, the plurality of instructions when executed by the one or more processors cause the one or more processors to:
transmit, by a network controller connected to a client device, a plurality of name queries, according to a name server list for cloud service handling, to identify a plurality of cloud servers that provide the cloud service;
probe each of the plurality of cloud servers based on results of the plurality of name queries;
create a dynamic path selection (DPS) policy for traffic from the client device to the cloud service based on results of the probes; and
intercept the name query from the client device without changing name query settings of the client device.

18. The non-transitory computer-readable storage medium of claim 17, the one or more processors further to:
intercept the name query and apply destination network address translation to the name query to send the name query to one of a plurality of name servers according to the name server list; and
receive a response of the destination network address translated name query identifying one of the plurality of cloud servers and use the one of the plurality of cloud servers for subsequent traffic for the cloud service.

19. The non-transitory computer-readable storage medium of claim 17, wherein the network controller comprises a branch gateway connected to the Internet via a plurality of uplinks, and wherein the client device is connected to the network controller via a branch site network, and the one or more processors further to:

select one of the plurality of uplinks for traffic from the client device to the cloud service according to the DPS policy.

20. The non-transitory computer-readable storage medium of claim 19, wherein each of the plurality of uplinks are connected to the Internet via more than one Internet service provider.

21. The non-transitory computer-readable storage medium of claim 19, wherein the one or more processors further to:
preconfigure a plurality of name servers, referenced in the name server list, to point to a virtual private network concentrator (VPNC) connected to a core site network and to the Internet, wherein the VPNC is for traffic from the client device to the core site network.

22. The non-transitory computer-readable storage medium of claim 17, wherein the one or more processors further to:
provide a deep packet inspection (DPI) identifier to the cloud service for reference by firewall, route, and DPS policies of a software defined wide area network.

23. The non-transitory computer-readable storage medium of claim 17, wherein the one or more processors further to:
store the name server list including a correspondence between each of a plurality of name servers and a respective next hop from the network controller to each of the plurality of name servers;
store a cloud server list including a correspondence between each of the plurality of cloud servers and each of the plurality of name servers according to results of the plurality of name queries; and
probe each of the plurality of cloud servers according to the name server list and the cloud server list.

24. The non-transitory computer-readable storage medium of claim 23, wherein the one or more processors further to:
send a respective plurality of name queries, based on the name server list for cloud service handling, to identify a respective plurality of cloud servers that provide each of a plurality of cloud services;
probe each of the respective pluralities of cloud servers based on results of the respective pluralities of name queries; and
store a DPS list as the DPS policy including, for each of the plurality of cloud services, a corresponding preferred cloud server based on results of the probes.

\* \* \* \* \*